United States Patent
Hock et al.

(10) Patent No.: US 9,333,937 B1
(45) Date of Patent: May 10, 2016

(54) AIRBAG COVER WITH STRESS RELIEF FEATURES

(71) Applicant: AUTOLIV ASP, INC., Ogden, UT (US)

(72) Inventors: Christopher Hock, Uintah, UT (US); Mark Hatfield, Providence, UT (US)

(73) Assignee: AUTOLIV ASP, INC., Ogden, UT (US)

( * ) Notice: Subject to any disclaimer, the term of this patent is extended or adjusted under 35 U.S.C. 154(b) by 0 days.

(21) Appl. No.: 14/566,564

(22) Filed: Dec. 10, 2014

(51) Int. Cl.
*B60R 21/2165* (2011.01)
*B60R 21/203* (2006.01)

(52) U.S. Cl.
CPC ........... *B60R 21/2165* (2013.01); *B60R 21/203* (2013.01); *B60R 21/21656* (2013.01)

(58) Field of Classification Search
CPC ..................... B60R 21/21656; B60R 21/2165; B60R 21/203; B60R 21/215; B60R 21/205
USPC ....................................... 280/728.3, 731, 732
See application file for complete search history.

(56) References Cited

U.S. PATENT DOCUMENTS

| | | | |
|---|---|---|---|
| 4,903,986 A | 2/1990 | Cok et al. | |
| 5,306,040 A | 4/1994 | Leonelli et al. | |
| 6,581,958 B2 | 6/2003 | Holtz | |
| 7,828,323 B1* | 11/2010 | Mazzocchi | B60R 21/215 |
| | | | 156/73.5 |
| 8,491,002 B2 | 7/2013 | Schneider et al. | |
| 2008/0296874 A1* | 12/2008 | Kanno | B60R 21/215 |
| | | | 280/728.3 |

* cited by examiner

*Primary Examiner* — Keith Frisby
(74) *Attorney, Agent, or Firm* — Stoel Rives LLP

(57) ABSTRACT

Airbag covers with stress relief features are disclosed. An airbag cover includes a cover face that opens during deployment and one or more sidewalls extending from the cover face to engage a housing of an airbag assembly. One or more tear seams formed in the airbag cover are rupturable upon expansion of the airbag to form the cover face as a hinged door that opens. Excess force can cause a tear seam to propagate through a stop, creating a risk that a portion of the airbag cover will separate from itself or the housing. Stress relief features are disposed in a sidewall to dissipate excess deployment energy and limit undesired breakage of the airbag cover or continued tearing of the tear seam beyond a tear seam stop. The stress relief features disclosed include tear seams and slits oriented transverse to front cover tear seams.

24 Claims, 8 Drawing Sheets

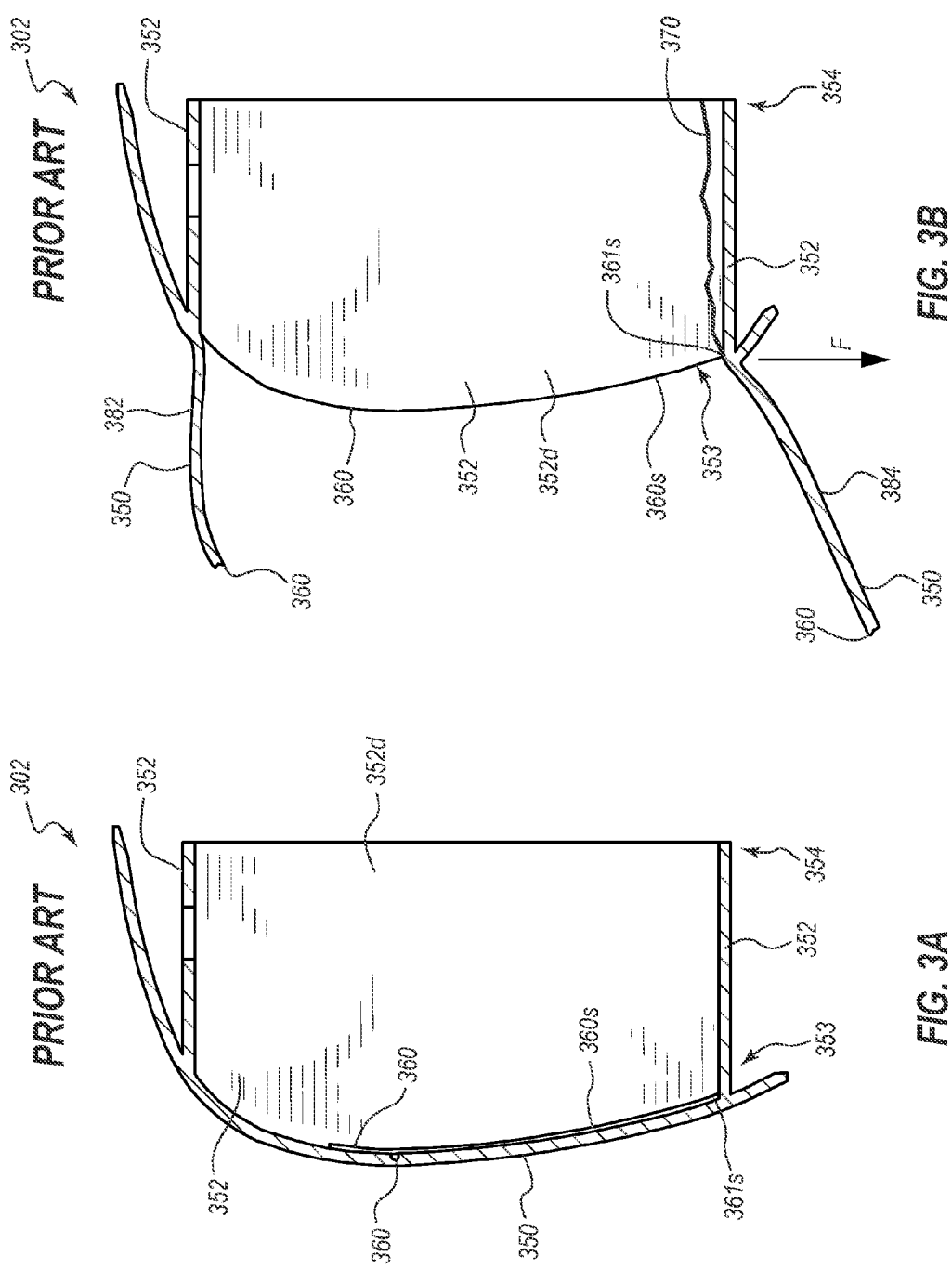

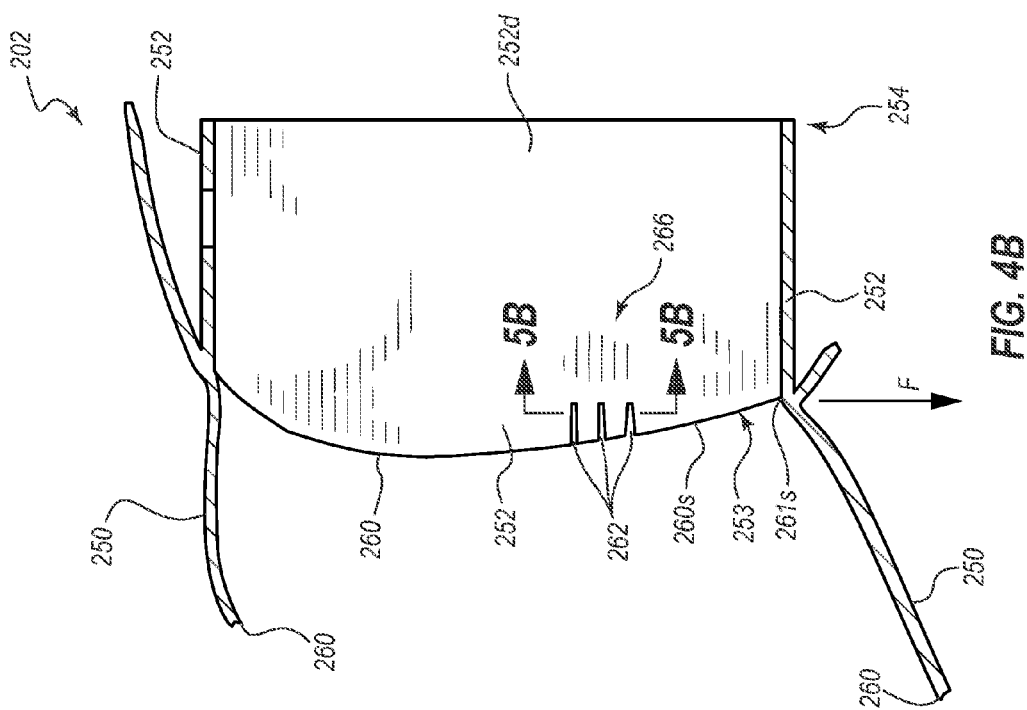
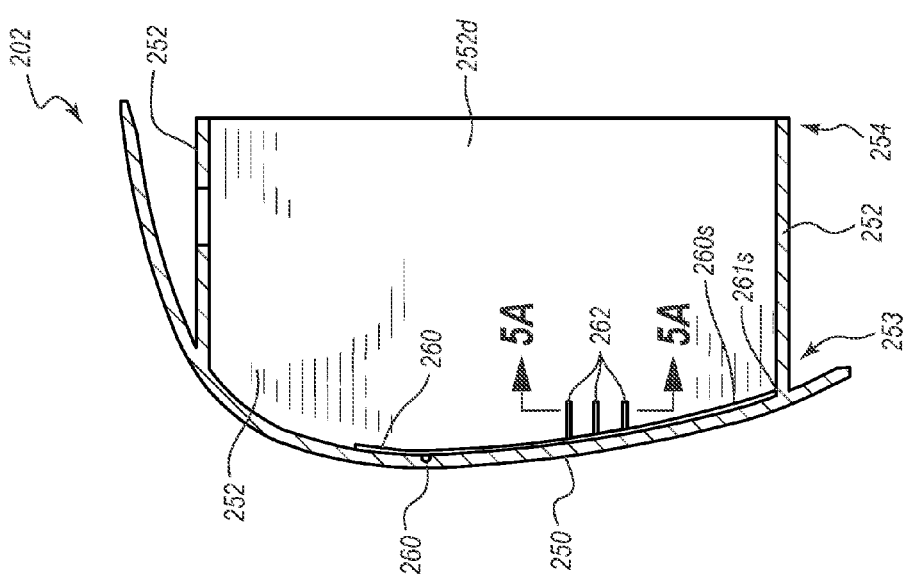

AIRBAG COVER WITH STRESS RELIEF FEATURES

BACKGROUND

Inflatable airbags may be mounted within a vehicle and deploy during a collision event. The deployed airbag may cushion an occupant and prevent detrimental impact with other vehicular structures. Some airbags suffer from one or more drawbacks or may perform less than optimally in one or more respects. Certain embodiments disclosed herein can address one or more of these issues.

BRIEF DESCRIPTION OF THE DRAWINGS

The written disclosure herein describes illustrative embodiments that are non-limiting and non-exhaustive. Reference is made to certain of such illustrative embodiments that are depicted in the figures, in which:

FIG. 3A is side cross-sectional view of a prior art airbag cover in an undeployed state.

FIG. 3B is side cross-sectional view of the prior art airbag cover of FIG. 3A in a deployed state.

FIG. 4A is side cross-sectional view of the airbag cover of FIG. 2A in an undeployed state.

FIG. 4B is side cross-sectional view of the airbag cover of FIG. 2A in a deployed state.

FIG. 5B illustrates stress relief slits prior to deployment.

DETAILED DESCRIPTION

Figure 1A:
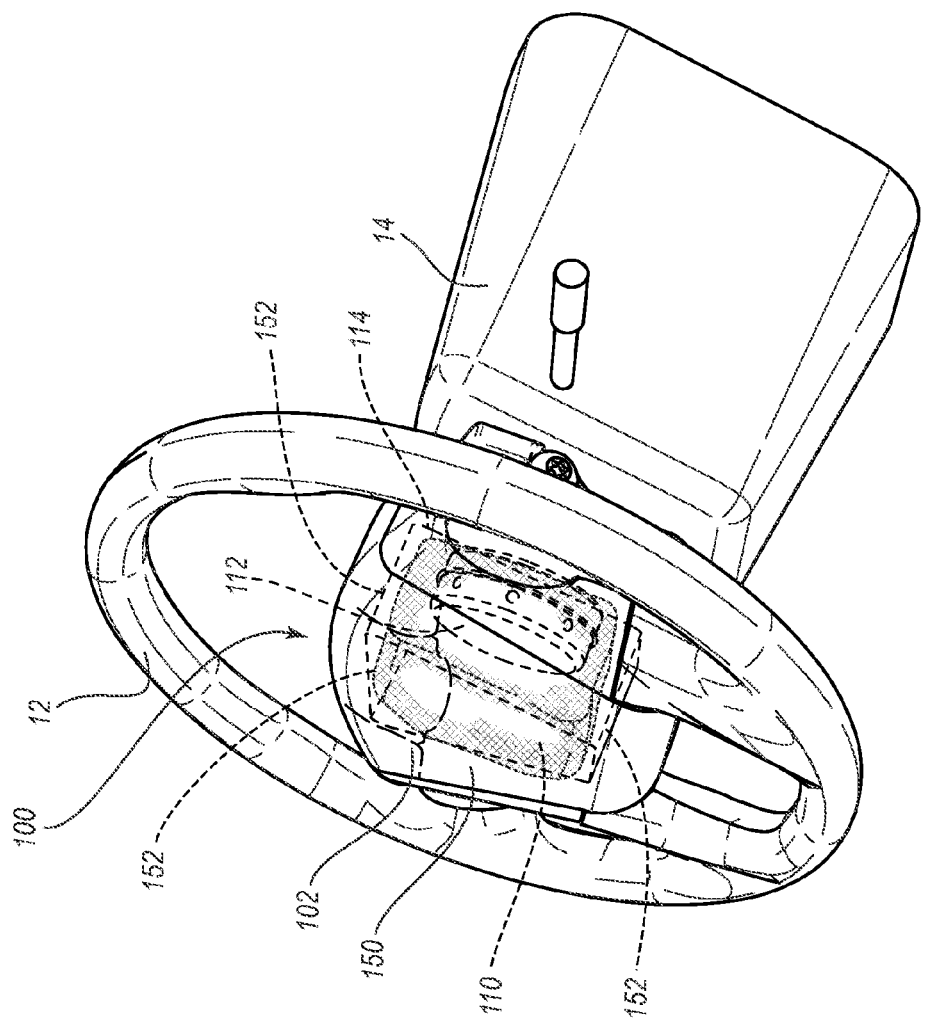
FIG. 1A is a perspective view of an embodiment of an airbag assembly mounted in a vehicle, wherein an embodiment of an airbag is shown in a packaged or undeployed state.

As will be readily understood, the components of the embodiments as generally described and illustrated in the figures herein could be arranged and designed in a wide variety of different configurations. Thus, the following more detailed description of various embodiments, as represented in the figures, is not intended to limit the scope of the present disclosure, but is merely representative of various embodiments. While various aspects of the embodiments are presented in drawings, the drawings are not necessarily drawn to scale unless specifically indicated.

The phrases "connected to" and "coupled to" are used in their ordinary sense, and are broad enough to refer to any suitable coupling or other form of interaction between two or more entities, including mechanical and fluid interaction. Two components may be coupled to each other even though they are not in direct contact with each other. The phrases "attached to" or "attached directly to" refer to interaction between two or more entities which are in direct contact with each other and/or are separated from each other only by a fastener of any suitable variety (e.g., mounting hardware or an adhesive). The phrase "fluid communication" is used in its ordinary sense, and is broad enough to refer to arrangements in which a fluid (e.g., a gas or a liquid) can flow from one element to another element when the elements are in fluid communication with each other.

Inflatable airbag systems are widely used to reduce or minimize occupant injury during a collision event. Airbag modules have been installed at various locations within a vehicle, including, but not limited to, the steering wheel, the dashboard and/or instrument panel, within the side doors or side seats, adjacent to a roof rail of the vehicle, in an overhead position, or at the knee or leg position. In the following disclosure, "airbag" generally refers to an inflatable front airbag, such as, for example, a passenger airbag that is typically housed within an instrument panel, although the principles discussed may apply to other types of airbags (e.g., driver airbags, knee airbags, and side airbags).

Front airbags are often installed in a dashboard or instrument panel of a vehicle. As used herein, the terms "dashboard" and "instrument panel" refer to a protruding region of a vehicle faced by a motor vehicle occupant, which often includes a glove compartment in a portion thereof that faces a passenger and may include instruments (e.g., radio and/or climate controls) in a more central region thereof, although such instruments need not be present. During installation, the airbags are typically at an interior of a housing in a packaged state (e.g., are rolled, folded, and/or otherwise compressed) and may be retained in the packaged state behind a cover. During a collision event, an inflator is triggered, which rapidly fills the airbag with inflation gas. The airbag can rapidly transition from the packaged state to an expanded or deployed state. For example, the expanding airbag can open an airbag cover (e.g., by tearing through a burst seam or opening a door-like structure) to extend outward from the housing. The inflator may be triggered by any suitable device or system, and the triggering may be in response to and/or influenced by one or more vehicle sensors.

Certain embodiments of airbag assemblies that are disclosed herein are particularly well suited for use as driver airbags, and may be mounted in a steering wheel. The airbag assemblies can include airbags that are configured to deploy in an advantageous way. One or more of the advantages of various embodiments described below will be evident from the present disclosure.

Figure 1B:
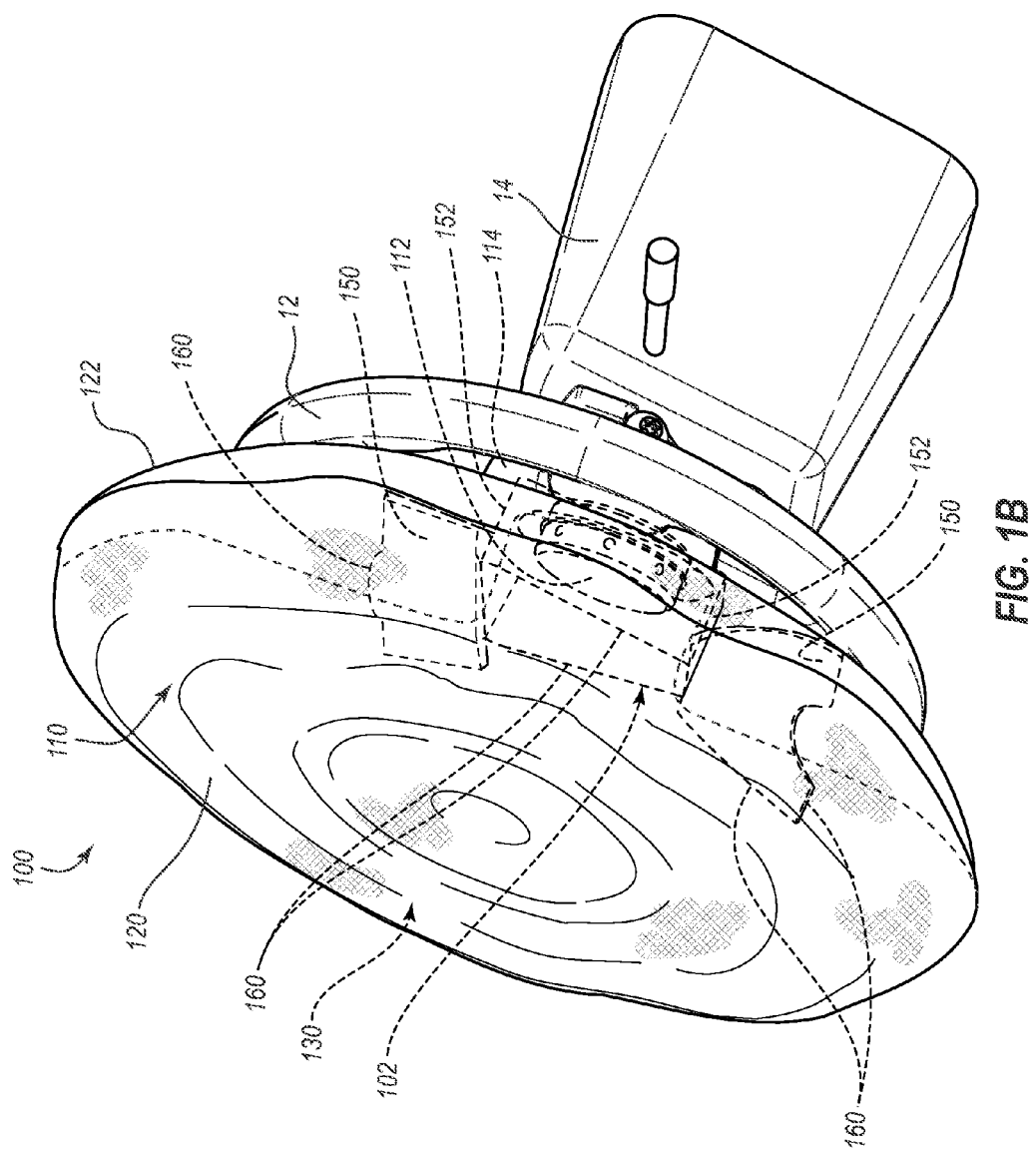
FIG. 1B is another perspective view of the airbag assembly of FIG. 1A showing the airbag in a deployed state.

FIGS. 1A and 1B are perspective views of an embodiment of an airbag assembly 100 mounted in a steering wheel 12 of a vehicle. The steering column 14 of the vehicle is also depicted. FIGS. 1A and 1B depict the airbag assembly 100 in two different configurations. FIG. 1A depicts the airbag assembly 100 in a packaged configuration, and FIG. 1B depicts the airbag assembly 100 in a deployed and inflated configuration.

The airbag assembly 100 may include an airbag cover 102, an inflatable airbag 110, an inflator 112, and a housing 114. The inflator 112 is in fluid communication with the airbag 110 and is configured to be actuated to generate inflation gas to expand the airbag 110. The inflator 112 is coupled to the housing 114, which is mounted to the vehicle, such as in the steering wheel 12 as illustrated. The airbag cover 102 is configured to engage or couple to the housing 114 to enclose and/or cover the unexpanded airbag 110 prior to deployment.

In the illustrated embodiment, the airbag 110 includes a cushioning panel 120. The cushioning panel, in the deployed and inflated configuration, is generally directed toward an occupant or an occupant position (e.g., a vehicle seat), and may at least partially define a cabin side of the airbag 110. A base panel 122 is located opposite the cushioning panel 120. In the illustrated embodiment, the base panel 122 is adjacent to the steering wheel 12 when the airbag 110 is in the deployed and inflated configuration. The cushioning panel 120 and the base panel 122 may also be referred to as a rear panel 120 and a front panel 122, in view of the relative positions of these panels within the vehicle when the airbag 110 is deployed. The base panel 122 and the cushioning panel 120 cooperate to define an inflatable chamber 130. The panels 120, 122 may also be referred to as airbag cushion membranes, and may be formed of any suitable material. For example, in some embodiments, the panels 120, 122 are formed of a woven nylon fabric. Moreover, a variety of types and configurations of airbag cushion membranes can be utilized in various embodiments. For example, the size, shape, and proportions of the cushion membrane may vary according to its use in different vehicles or different locations within a vehicle.

The airbag cover 102 may include a front covering portion 150 and a plurality of sidewalls 152. The front covering portion 150 may include a cover face that is configured to face toward an occupant of a vehicle when the airbag cover 102 is disposed on an airbag assembly mounted in a vehicle. The front covering portion 150 may define an "A" surface of the airbag assembly 100. The airbag cover 102, and in certain embodiments the front covering portion 150 in particular, is configured to open during deployment of the airbag 110. For instance, actuation of the inflator 112 may force the airbag cover 102 to burst or tear open.

To facilitate opening of the airbag cover 102, the airbag cover 102 may include one or more front covering tear seams 160 that are rupturable upon expansion of the airbag 110. The one or more front covering tear seams 160 may be configured to form at least a part of the front covering portion 150 as a hinged door that opens as a result of deployment of the airbag assembly 100 and through which the airbag 110 expands. In the illustrated embodiment, the front covering tear seams 160 form the front covering portion 150 as a pair of hinged doors (one of which rotates upward to open and the other of which rotates downward to open). At least one of the front covering tear seams 160 may be disposed at a point of connection between the front covering portion 150 and a sidewall of the plurality of sidewalls 152. In some embodiments, the front covering portion 150 may be formed as a single hinged door. In other embodiments, the hinged doors may open laterally (e.g., left and right directions). In still other embodiments, a single hinged door may hinge at the top, at the bottom, or at either lateral side.

As will be discussed in greater detail below, the sidewalls 152 extend from the front covering portion 150 forward relative to the vehicle and away from an occupant of the vehicle (e.g., deeper into the steering wheel 12, toward the steering column 14). The sidewalls 152 may be configured to engage the housing 114 of the airbag assembly 100 to enclose the unexpanded airbag 110.

Presently available airbag covers are vulnerable to undesired tear propagation. The front covering tear seams can tend to tear further than desired in areas of high stress that result from deformation of the airbag cover at deployment. The undesired tearing tends to propagate along a section of a sidewall (e.g., a thinner portion of the sidewall) and down to an open edge of the sidewall (e.g., at a free end of the sidewall opposite the closed end coupled to the front covering portion). A tear propagation to an open edge of a sidewall can allow a portion of the airbag cover to become detached from the housing and/or the rest of the airbag cover. A detached portion of an airbag cover at deployment of an airbag assembly becomes, in effect, a projectile that poses great risk of injury and/or damage.

Even in presently available airbags where tear propagation is not problematic, the disclosed stress relief features can improve robustness of an airbag cover of an airbag assembly. Where vulnerabilities of the airbag cover are discovered, such as during manufacturing, stress relief features according to the present disclosure can be added to direct deployment energy toward stronger portions of the airbag cover (e.g., areas of thicker material) or otherwise improve robustness, strength, reliability, and the like of the airbag cover. In particular, the stress relief features can direct excess deployment energy toward a desired portion of the airbag cover, such as away from vulnerable portions (e.g., areas of thinner material, areas near door/flap hinges).

The disclosed embodiments include one or more stress relief features, such as slits and/or tear seams disposed in one or more side walls. The stress relief features are oriented transverse to a front covering tear seam and extend from the front covering tear seam toward an interior of the sidewall. The stress relief features may limit undesired breakage of the airbag cover, including tearing of the sidewalls or other portion of the airbag cover.

The stress relief features that are stress relief tear seams are configured to tear based on an amount of deployment energy released. The stress relief tear seams tear to reduce the tearing of the front covering tear seam and to dissipate a portion of the deployment energy in a manner to limit undesired tearing of the front covering tear seam down one or more of the plurality of sidewalls.

The stress relief features that are stress relief slits are configured to expand or open to direct excess deployment energy to a desired portion of the airbag cover. For example, the stress relief slits may be oriented to direct energy toward a design feature of the airbag cover, such as a thickened portion. As another example, the stress relief slits may be oriented to direct energy to a desired portion of the airbag cover that is away from a vulnerable portion of the airbag cover, such as a portion of the airbag cover near a cover door/flap hinge area.

Figure 2A:
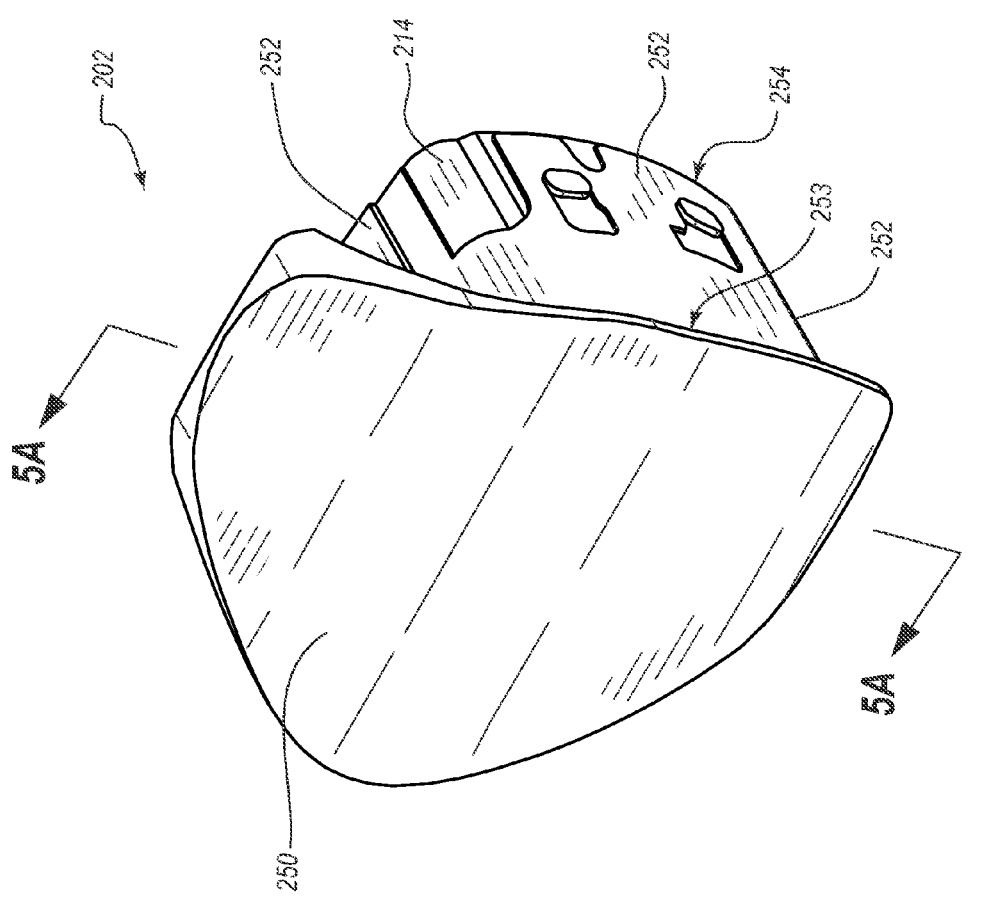
FIG. 2A is a perspective view of an airbag cover, according to one embodiment of the present disclosure.
Figure 2B:
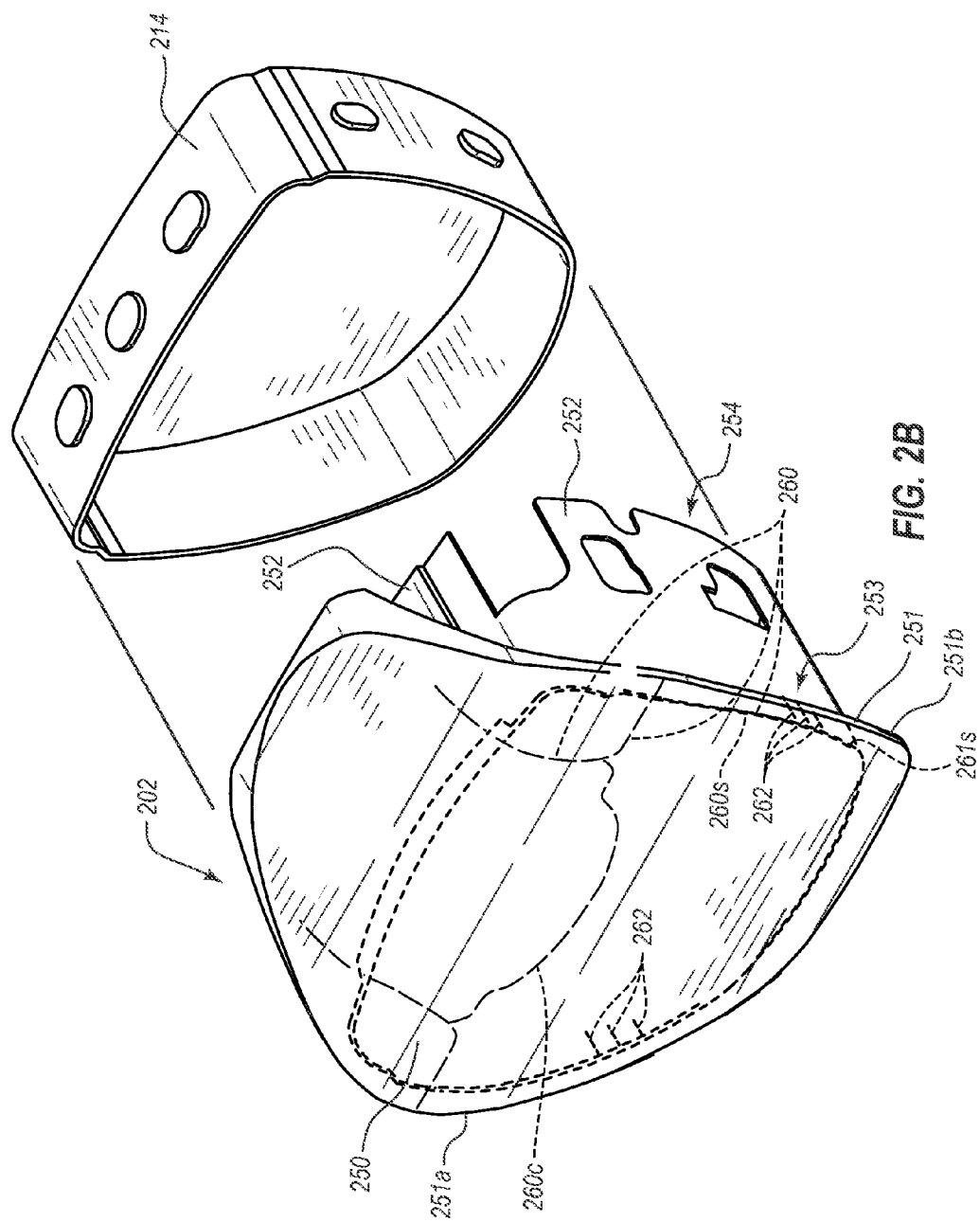
FIG. 2B is an exploded perspective view of the airbag cover of FIG. 2A.
Figure 2C:
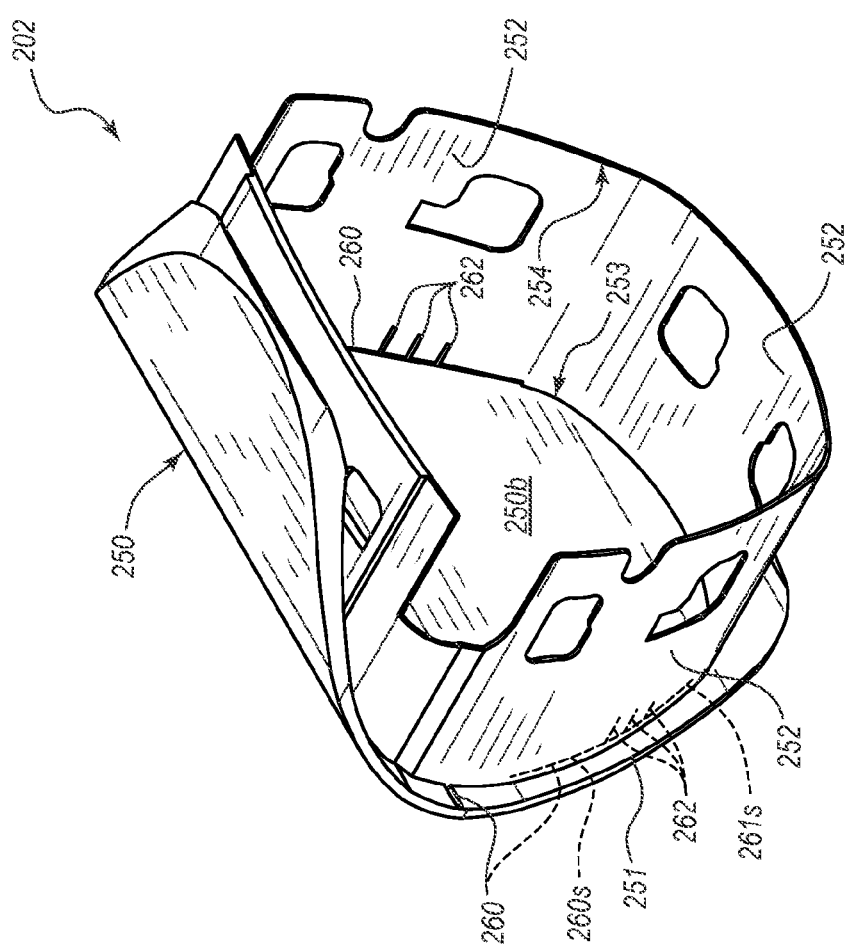
FIG. 2C is another perspective view of the airbag cover of FIG. 2A.

FIG. 2A is a perspective view of an airbag cover 202, according to one embodiment of the present disclosure, engaged with a housing 214 of an airbag assembly. FIG. 2B is another perspective view of the airbag cover 202 of FIG. 2A disengaged from the housing 214. FIG. 2C is another perspective view of the airbag cover 202 of FIG. 2A, illustrating an underside or enclosing side of the airbag cover 202. The housing 214 can be mounted in a vehicle, such as in a steering wheel of the vehicle. The airbag cover 202 engages with the housing 214 to enclose an airbag 110 in an unexpanded state, as shown in FIG. 1A and described above with reference to the same.

The airbag cover 202 shown in FIGS. 2A, 2B and 2C includes a front covering portion 250 (also referred to as a cover face) and one or more sidewalls 252. The front covering portion 250 may define an "A" surface of the airbag cover 202 that is configured to face an occupant of a vehicle in which the airbag cover 202 is installed. The front covering portion 250 is configured to open during deployment of an airbag 110 disposed within (e.g., enclosed by) the front covering portion 250, as shown in FIG. 1B. One or more tear seams 260 may be formed in the airbag cover 202 and are configured to tear or otherwise open to release an expanding airbag, as will be discussed more fully below.

The one or more sidewalls 252 extend from an underside or enclosing side of the front covering portion 250. When the airbag cover is installed in a vehicle, the sidewalls 252 extend from the front covering portion 250 in a generally forward direction (relative to the direction of the vehicle), away from an occupant (e.g., driver) of the vehicle. In other words, the sidewalls 252 extend deeper into the steering wheel, toward the steering column. The sidewalls 252 are arranged and coupled in relation to each other to form an enclosure. In FIGS. 2A, 2B, and 2C, the sidewalls 252 are shaped and configured to form a trapezoidal (or rounded trapezoidal) enclosure. In other words, a slice of the enclosure, parallel with the "A" surface, and through all the sidewalls 252, is generally trapezoidal. As can be appreciated, the one or more sidewalls 252 may include any number (e.g., one, two, three, four (as shown), five, etc.) and may be arranged in a variety of shapes (whether described two dimensionally or three dimensionally). For example, a single sidewall 252 may be configured to form a circular (or cylindrical) enclosure. Similarly, multiple sidewalls 252 may be arranged to form a circular enclosure. Still further, multiple sidewalls 252 may be configured in a variety of shapes (e.g., geometric shapes such as a triangle, square, rectangle, pentagon, hexagon, etc.).

A closed end of the enclosure, at a first edge or closed edge 253 of each side wall 252, is attached to the underside 250$b$ of the front covering portion 250. An open end of the enclosure, at a second edge or open edge 254 of each sidewall 252, is configured to engage or otherwise couple to the housing 214. In FIGS. 2A, 2B, and 2C, the closed edge 253 of each side wall 252 is coupled to the front covering portion 250 at a position disposed inward from an edge 251 of the front covering portion 250. A portion of the front covering portion 250 may extend laterally beyond a perimeter formed by the plurality of the sidewalls 252, such that the edge 251 is disposed a distance outward from where the corresponding sidewall 252 couples to the front covering portion 250, as shown in FIGS. 2A, 2B, and 2C.

The airbag cover 202 may include a plurality of tear seams to tear to allow release or deployment of the airbag 110 as it expands. As shown in FIGS. 2B and 2C, one or more front covering tear seams 260 may be formed in the sidewalls 252 and are rupturable upon deployment or expansion of the airbag to form the front covering portion 250 as a hinged door that opens. A tear seam, such as any of the front covering tear seams 260, may be formed as a groove, notch, or channel in the wall of material of the airbag cover 202 (see, for example, FIG. 5A showing stress relief tear seams). As such, the wall of material is more thin at the tear seam and can more easily open, rupture, or tear at deployment and/or expansion of an airbag enclosed within the airbag cover 202. Some of the tear seams 260 of the illustrated embodiment are formed in an inner side or enclosure side of the sidewalls 252. However, as can be appreciated, these tear seams 260 may also be formed in an outer side of the sidewalls 252. These tear seams 260 are disposed at or near a connection (e.g., at a point of connection or along a line of connection) of the front covering portion 250 and one or more of the sidewalls 252. These tear seams 260 extend along the connection between the front covering portion 250 and one or more of the sidewalls 252 to allow the front covering portion 250 to open during deployment of an airbag, as will be described.

In the illustrated embodiment, the front covering tear seams 260 are formed in the sidewalls 252, such that the sidewalls 252 tear along the tear seams 260 to allow the front cover 250 to tear and hinge open. In other embodiments, the front covering tear seams 260 may be formed in an underside or enclosure side of the front covering portion 250, such that the front covering portion 250 tears to hinge open. In still other embodiments, the front covering tear seams 260 may be formed at the connection between the front covering portion 250 and the sidewalls 252, such that the tearing of the tear seams 260 allows the front covering portion 250 to separate from one or more of the sidewalls 252 to hinge open during deployment.

With particular reference to FIG. 2B, the front covering tear seams 260 may also include a cross tear seam 260$s$ oriented across the front covering portion 250 from a first edge 251$a$ of the front covering 250 to a second edge 251$b$ of the front covering 250. The cross tear seam 260$s$ is configured to tear to divide the front covering portion 250 into an upper hinged door and a lower hinged door, as shown in FIGS. 4A and 4B and described below with reference to the same. In the illustrated embodiment, the cross tear seam 260$s$ is formed in an underside or enclosure side of the front covering portion 250. As can be appreciated, in other embodiments, the cross tear seam 260$s$ may be formed in an outer side of the front covering portion 250.

The end of a tear seam may be referred to as a tear seam stop. The tear seam stop can be considered to be a point or region where the groove, notch, or channel of the tear seam in the wall of material ends and the wall of material returns to be a more normal thickness. The relative thickness of the material at the tear seam stop is intended to halt propagation of a tear in that material. For example, the cross tear seam 260$s$ of FIG. 2B does not include tear seam stops. The cross tear seam 260$c$ is intended to allow the front covering portion 250 to tear from the first edge 251$a$ to the second edge 251$b$, thereby dividing the front covering portion 250 into two hinged doors. However, lateral front covering tear seams 260, such as a side front covering tear seam 260$s$, include tear seam stops that are intended to stop tearing to ensure that the front covering portion 250 remains coupled to the airbag cover 202 at a hinged portion. Otherwise, were the lateral tear seams 260 to continue tearing to an open edge, the front covering portion 250 may separate from the rest of the airbag cover 202 during deployment. The side front covering tear seam 260$s$ includes a tear seam stop 261$s$ to slow and even halt tearing of the airbag cover 202 at an end of the front covering tear seam 260$s$.

In some circumstances, a force of deployment can exceed a threshold at which the tear seam stop 261$s$ is configured to stop the tearing. Accordingly, tearing along the side front covering tear seam 260$s$ may be perpetuated beyond the tear seam stop 261$s$. The continued tearing of a tear seam 260 beyond a tear seam stop can be dangerous and otherwise undesired, as will be further discussed below with reference to FIGS. 3A and 3B.

To alleviate continued tearing of the side front covering tear seam 260$s$ beyond the tear seam stop 261$s$ or other breakage of the cover 202, the airbag cover 202 of FIGS. 2A, 2B, and 2C includes one or more stress relief features 262. In the illustrated embodiment of FIGS. 2A, 2B, and 2C, the stress relief features 262 are stress relief tear seams. The stress relief tear seams 262 are disposed in a sidewall 252 and oriented or otherwise extending transverse to the side front covering tear seam 260$s$. The stress relief tear seams 262 extend from the side front covering tear seam 260$s$ a distance toward an interior of the sidewall 252. The stress relief tear seams 262 are configured to tear based on an amount of deployment energy to dissipate a portion of the deployment energy in excess of the threshold at which the tear seam stop 261$s$ is configured to stop tearing. The stress relief tear seams 262 are configured to dissipate the excess deployment energy in a manner to limit undesired continued tearing of the side front covering tear seam 260$s$ beyond the front covering tear seam stop 261$s$.

As can be appreciated, in other embodiments, the stress relief tear features may be stress relief slits, which may be cuts or pre-formed gaps in the material of the sidewall 252. The stress relief slits may be positioned where the stress relief tear seams 262 are, and may function substantially similarly, except that tearing may not occur. The stress relief slits may open or expand in response to excess deployment energy to direct such energy toward a desired portion of the airbag cover. For example, the stress relief slits may be oriented to direct energy to a desired portion of the airbag cover that may be a thickened portion (a thicker or greater quantity of material that forms the sidewall and/or airbag cover). As another example, the stress relief slits may be oriented to direct energy to a desired portion of the airbag cover that is away from a vulnerable portion of the airbag cover, such as a portion of the airbag cover near a cover door hinge area. The stress relief slits may be similar to and appear like a pre-torn (already torn) tear seam, as described below with reference to FIG. 5B.

FIGS. 3A and 3B illustrate undesired tearing that can occur when deployment energy exceeds a threshold at which a tear seam of a prior art airbag cover 302 can prevent continued tearing.

FIG. 3A is a side cross-sectional view of a prior art airbag cover 302 in an undeployed state. The airbag cover 302 is depicted prior to a deployment of an airbag assembly and/or airbag that the airbag cover 302 may enclose. The airbag cover 302 comprises a front covering portion 350 and a plurality of sidewalls 352 that extend from the front covering portion 350 to engage a housing (not shown for the sake of simplicity). The airbag cover 302 also includes a plurality of front covering tear seams 360 formed in the airbag cover 302 that are configured to tear or otherwise open to allow the front covering portion 350 to release an expanding airbag. The illustrated prior art airbag cover 302 does not include any stress relief seams.

FIG. 3B is side cross-sectional view of the airbag cover 302 of FIG. 3A in a deployed state, such as after expansion of an airbag (not shown for the sake of simplicity). FIG. 3B illustrates undesired continued tearing of a front covering tear seam 360 beyond a front covering tear seam stop 361s. The front covering tear seams 360 have burst, forming the front covering portion 350 as an upper hinged door 382 and a lower hinged door 384. Deployment energy exceeded a threshold level and created a force F of a magnitude beyond what the airbag cover material could withstand. As a result, undesired continued tearing of front covering tear seam 360 occurred. One of the lateral front covering tear seams 360s continued tearing past a tear seam stop and down a lateral sidewall 352d, forming a tear 370 in the lateral sidewall 352d. A portion of the continued tearing past the tear seam stop 361s may be referred to as a continued tear 370. The continued tear 370 is shown extending from a closed edge 353 of the lateral sidewall 352d to an open edge 354 of the lateral sidewall 352d. The continued tear 370 may allow the sidewalls 352 to disengage or otherwise release from a housing (not shown) during deployment and, thus, become a projectile object during deployment. Recognizing that continued tearing is undesirable, and that projectile objects from the airbag cover 302 are more undesirable, the present inventors have attempted to address these concerns in the disclosed embodiments by adding one or more stress relief features that are configured to dissipate excess deployment energy.

FIG. 4A is side cross-sectional view of the airbag cover 202 of FIG. 2A in an undeployed state. As described above, the airbag cover 202 comprises a front covering portion 250 and a plurality of sidewalls 252 that extend from the front covering portion 250 to engage a housing (not shown for the sake of simplicity). The airbag cover 202 also includes a plurality of front covering tear seams 260 formed in the airbag cover 202 that are configured to tear or otherwise burst to allow the front covering portion 250 to release an expanding airbag (not shown). The airbag cover 202 includes one or more stress relief tear seams 262. The stress relief tear seams 262 are formed or otherwise disposed in an inner surface of the material of a lateral sidewall 252d. The stress relief tear seams 262 are oriented transverse (or even orthogonal) to the front covering tear seam 260 that is disposed along a connection between the front covering portion 250 and the lateral sidewall 252d. The stress relief tear seams 262 extend from the front covering tear seam 260 toward an interior of the lateral sidewall 252d. Described differently, the stress relief tear seams 262 are disposed in the airbag cover material at or near a closed edge 253 of the lateral sidewall 252d.

The stress relief tear seams 262 are configured to tear as needed, or based on an amount of deployment energy. If the deployment energy is high enough to exceed a threshold level, the stress relief tear seams 262 can burst or tear to dissipate a portion of the deployment energy to slow down the tearing of the front covering tear seam 260. In this manner, the stress relief tear seams 262 limit or prevent undesired continued tearing of the side front covering tear seam 260s beyond a front covering tear seam stop 261s.

In other embodiments, the stress relief tear seams 262 may be replaced by stress relief slits. The stress relief slits may be similar to pre-torn tear seams 262, such that there are already cuts or gaps in the material of the sidewall 252 and may or may not be configured to further tear. The stress relief slits may open or expand in one or both directions substantially parallel to the front cover tear seam 260 from which the stress relief slits extend. In this manner, the stress relief slits may direct energy toward a portion of the airbag cover at or beyond an extent of the stress relief cut. The portion of the airbag cover to which the energy is directed may be thicker or more robust than other portions of the airbag cover and better able to respond to the energy. Alternatively, the portion of the airbag cover 202 to which the energy is directed may allow for a different manner of behavior, such as causing the portion of the cover to pivot along a designed hinge line or detach at a preordained section while being restrained at another section. In this manner, the stress relief slits can improve robustness of the airbag cover and/or limit undesired breakage of the airbag cover, including tearing of the airbag cover.

FIG. 4B is side cross-sectional view of the airbag cover 202 of FIG. 4A in a deployed state. The deployment energy exceeded a threshold level and generated a force F that is greater than the tear seam stop 261s may withstand and thus the stress relief tear seams 262 have torn. The tearing of the stress relief tear seams 262 dissipates excess deployment energy. The stress relief tear seams 262 operate or function to control and limit undesired tearing down the sidewalls 252 to limit or prevent complete detachment of a portion of the airbag cover 202 from a remaining portion of the airbag cover 202 and/or from a housing. The stress relief tear seams 262 tear to reduce tear propagation in a high stress area of the airbag cover 202 due to deformation of the airbag cover 202 at deployment. As an example, the stress relief tear seams 262 tear to reduce continued tearing through a tear seam stop due to deformation of the front covering portion 250 at deployment. The stress relief tear seams 262 are positioned in the lateral sidewall 252d a distance away from a high stress area of the airbag cover 202, such as the tear seam stop 261s.

The stress relief tear seams 262 can be configured to direct a stress relief tear towards a design feature 266 in the lateral sidewall 252d. The design feature 266 may be a thickened section of the lateral sidewall 252d. The design feature 266 may be a hinged section.

The stress relief tear seams 262 that are depicted in FIG. 4B are relatively straight. However, as can be appreciated, the stress relief tear seams 262 may be curved, such that a first end of a stress relief tear seam 262 is oriented transverse to the front covering tear seam 260 and a second end of that first stress relief tear seam 262 is oriented differently from the first end.

In other embodiments, the stress relief tear seams 262 may be replaced by stress relief slits, as mentioned above. The stress relief slits may be cuts or gaps formed in the sidewalls and, prior to deployment, may appear substantially similar to the deployed stress relief tear seams 262 of FIG. 4B.

Although FIG. 3B depicts tear propagation (e.g., continued tear 370) in a lateral sidewall 352d, and the discussion of FIGS. 4A and 4B above is similarly described with reference to a lateral sidewall 252d, tear propagation can be limited in any sidewalls 252 and the front covering portion 250. The stress relief tear seams 262 can be configured and arranged to limit any undesired tear propagation into or through any single sidewall 252 or any combination of sidewalls 252.

Accordingly, a first set of stress relief features may be disposed in a first lateral sidewall and may be configured to limit undesired tearing of a first front covering tear seam down one or more sidewalls of a first subset of the one or more sidewalls. The first subset of sidewalls may include the first lateral sidewall. A second set of stress relief features may be disposed in a second lateral sidewall (e.g., opposite the first lateral sidewall) and may be configured to limit undesired tearing of a second front covering tear seam down one or more sidewalls of a second subset of the one or more sidewalls. The second subset of sidewalls may include the second lateral sidewall.

FIG. 5A is cross-sectional view of the lateral sidewall 252d of the airbag cover of FIG. 2A, illustrating the stress relief tear seams 262 prior to deployment. The cross-section in the view is taken through the line 5A-5A that is illustrated in FIG. 4A. The stress relief tear seams 262 may be formed as a groove, notch, or channel in the wall of material of the sidewall 252d of the airbag cover 202. The material of the sidewall 252d is more thin at the tear seam and can more easily burst, rupture, or tear, for example, at deployment and/or expansion of an airbag within the airbag cover 202. In this manner, the stress relief tear seams 262 provide a controlled tear that can effectively dissipate excess deployment energy to limit or prevent undesired tear propagation at high stress areas of the airbag cover 202.

Figure 5B:
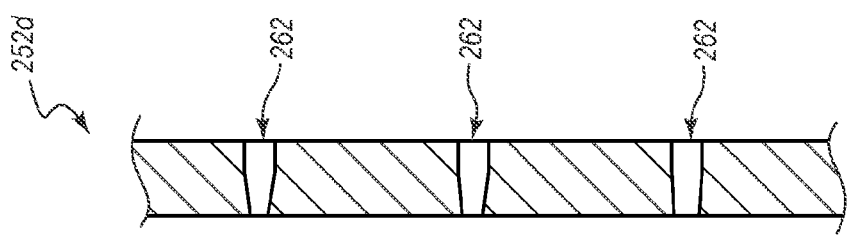
FIG. 5B is cross-sectional view of the sidewall of FIG. 5A, illustrating stress relief tear seams after deployment. Alternatively or in addition.
Figure 5A:
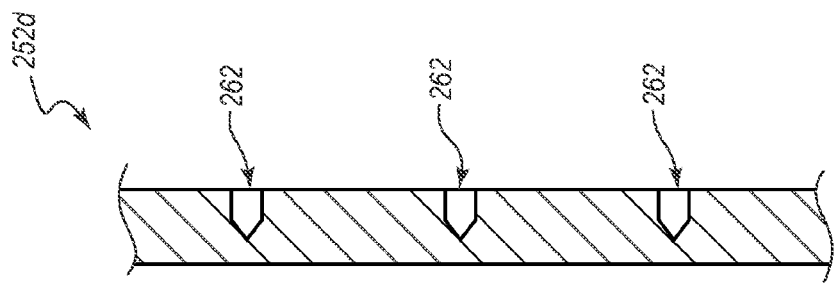
FIG. 5A is cross-sectional view of a sidewall of the airbag cover of FIG. 2A, illustrating stress relief tear seams prior to deployment.

FIG. 5B is a cross-sectional view of the lateral sidewall 252d of FIG. 5A, illustrating the stress relief tear seams 262 torn following a deployment. The cross-section in the view is taken through the line 5B-5B in FIG. 4B. As the stress relief tear seams 262 tear, energy is dissipated to slow down tearing of a front covering tear seam and to limit or prevent tear perpetuation of the front covering tear seam through a tear seam stop.

As described previously, other embodiments may include stress relief features other than stress relief tear seams. The foregoing embodiments have been described with reference to stress relief tear seams, but should not be construed to limit use of other stress relief features. As an example, the stress relief tear seams of the foregoing embodiments may be replaced with stress relief slits, which may be cuts or gaps in the sidewall material at the same or a similar position to the tear seams.

Continuing with reference to FIG. 5B, although a depiction of torn stress relief tear seams is shown, FIG. 5B also depicts stress relief slits 262 in a sidewall 252d of the airbag cover. The stress relief slits 262 shown in FIG. 5B can open or further expand, for example, so as to be wider (e.g., a larger gap in the sidewall along an axis of the sidewall extending from a top of the drawing to the bottom of the drawing in FIG. 5B). The expansion of the stress relief slits 262 in effect directs energy to an end of the stress relief slits 262, deeper into the sidewall 252d. Accordingly, the stress relief slits 262 can be oriented so as to direct energy to a desired portion of the airbag cover, and away from an undesired portion of the airbag cover.

It will be obvious to those having skill in the art that many changes may be made to the details of the above-described embodiments without departing from the underlying principles of the invention. The scope of the present invention should, therefore, be determined only by the following claims.

We claim:

1. An airbag cover, comprising:
 a front covering portion to open during deployment of an unexpanded airbag disposed within the airbag cover;
 one or more sidewalls extending from the front covering portion, the one or more sidewalls to engage a housing of an airbag assembly to enclose the unexpanded airbag;
 one or more front covering tear seams formed in the airbag cover that are rupturable upon expansion of the airbag, the one or more front covering tear seams to form at least a portion of the front covering as a hinged door that opens and through which the airbag expands, a first front covering tear seam disposed along a connection between the front covering portion and a first sidewall of the one or more sidewalls, the first front covering tear seam defining a tear propagation portion and terminating at a first tear seam stop; and
 a first stress relief feature disposed in the first sidewall and distanced away from the first tear seam stop, the first stress relief feature oriented transverse to the first front covering tear seam and extending from the tear propagation portion of the first front covering tear seam toward an interior of the first sidewall, wherein the first stress relief feature is configured to direct deployment energy toward a desired portion of the airbag cover to limit undesired breakage of the airbag cover.

2. The airbag cover of claim 1, wherein the first stress relief feature is oriented orthogonal to the first front covering tear seam.

3. The airbag cover of claim 1, wherein the first stress relief feature comprises a first stress relief tear seam configured to tear based on an amount of deployment energy to slow down the tearing of the first front covering tear seam and to dissipate a portion of the deployment energy in a manner to limit undesired tearing of the first front covering tear seam beyond the first tear seam stop.

4. The airbag cover of claim 3, wherein the first stress relief tear seam is configured to tear when the deployment energy exceeds a threshold level to dissipate the portion of deployment energy in excess of the threshold level.

5. The airbag cover of claim 3, wherein the first stress relief tear seam is configured to tear to dissipate excess deployment energy to prevent detachment of a portion of the airbag cover from the airbag cover and from the housing.

6. The airbag cover of claim 3, wherein the first stress relief tear seam is configured to tear to dissipate excess deployment energy to reduce tear propagation in a high stress area of the airbag cover due to deformation of the airbag cover at deployment to prevent a portion of the airbag cover from separating from the airbag cover and from the housing.

7. The airbag cover of claim 1, wherein the first stress relief feature is configured to direct excess deployment energy towards a design feature in the first sidewall.

8. The airbag cover of claim 7, wherein the design feature is a thickened section.

9. The airbag cover of claim 1, wherein the first stress relief feature is configured to dissipate a portion of the deployment energy in a manner to limit undesired continued tearing of the first front covering tear seam beyond the first tear seam stop and down one or more of the one or more sidewalls.

10. The airbag cover of claim 1, further comprising a first plurality of stress relief features disposed in the first sidewall, wherein the first plurality of stress relief features includes the first stress relief feature, wherein each of the first plurality of stress relief features is oriented transverse to the first front covering tear seam and extends from the first front covering tear seam toward an interior of the first sidewall, and each of the first plurality of stress relief features is configured to direct deployment energy toward the desired portion of the cover to limit undesired breakage of the cover.

11. The airbag cover of claim 10, wherein one or more of the first plurality of stress relief features comprises a stress relief tear seam configured to tear based on the amount of deployment energy to slow down the tearing of the first front covering tear seam and dissipate deployment energy in a manner to limit undesired tearing of the first front covering tear seam beyond the first front covering tear seam stop.

12. The airbag cover of claim 1, wherein the one or more sidewalls comprise a plurality of sidewalls, wherein the one or more front covering tear seams comprise a second front covering tear seam disposed at a point of connection between the front covering portion and a second sidewall of the plurality of sidewalls, the airbag cover further comprising:
   a second stress relief feature disposed in a second sidewall of the plurality of sidewalls, the second stress relief feature oriented transverse to the second front covering tear seam and extending from the second front covering tear seam toward an interior of the second sidewall, wherein the second stress relief tear seam is configured to direct deployment energy toward a second desired portion of the airbag cover to limit undesired breakage of the airbag cover.

13. The airbag cover of claim 12, wherein the second stress relief feature comprises a second stress relief tear seam configured to tear based on an amount of deployment energy to slow down the tearing of the second front covering tear seam and dissipate deployment energy in a manner to limit undesired breakage of the airbag cover, including undesired continued tearing of the second front covering tear seam beyond a second tear seam stop.

14. The airbag cover of claim 13, further comprising:
   a first plurality of stress relief tear seams disposed in the first sidewall, wherein the first plurality of stress relief tear seams includes the first stress relief tear seam, wherein each of the first plurality of stress relief tear seams is oriented transverse to the first front covering tear seam and extends from the first front covering tear seam toward an interior of the first sidewall, and wherein each of the first plurality of stress relief tear seams is configured to tear based on an amount of deployment energy to slow down the tearing of the first front covering tear seam and dissipate deployment energy in a manner to limit undesired tearing of the first front covering tear seam beyond the first tear seam stop; and
   a second plurality of stress relief tear seams disposed in the second sidewall, wherein the second plurality of stress relief tear seams includes the second stress relief tear seam, wherein each of the second plurality of stress relief tear seams is oriented transverse to the second front covering tear seam and extends from the second front covering tear seam toward an interior of the second sidewall, and wherein each of the second plurality of stress relief tear seams is configured to tear based on an amount of deployment energy to slow down the tearing of the second front covering tear seam and dissipate deployment energy in a manner to limit undesired tearing of the second front covering tear seam beyond the second tear seam stop.

15. The airbag cover of claim 1, wherein the one or more front covering tear seams comprise a plurality of tear seams that includes a cross tear seam across the front covering portion that is configured to tear to divide the front covering portion into an upper hinged door and a lower hinged door and other tear seams of the plurality of tear seams form the front covering as the upper hinged door and the lower hinged door that open and through which the airbag expands.

16. The airbag cover of claim 1, wherein the line of connection between the front covering portion and the first sidewall is disposed inward from an edge of the front covering portion, such that a portion of the front covering portion extends laterally beyond a perimeter formed by the one or more sidewalls.

17. An airbag cover, comprising:
   a cover face configured to face an occupant of a vehicle, when the airbag cover is installed in the vehicle with an airbag assembly;
   one or more sidewalls attached to and extending from the cover face, the one or more sidewalls to engage a housing of the airbag assembly to enclose an unexpanded airbag of the airbag assembly;
   one or more cover face tear seams formed in the airbag cover that are rupturable upon expansion of the airbag, the one or more cover face tear seams to form at least a portion of the cover face as a hinged door that rotates about a hinge area and through which the unexpanded airbag expands during deployment, a first cover face tear seam disposed along an intersection between the cover face and a first sidewall of the one or more sidewalls, the first front covering tear seam terminating at the hinge area; and
   a first stress relief feature formed in the first sidewall and distanced away from the hinge area, the first stress relief feature oriented transverse to the first cover face tear seam and extending from the first cover face tear seam toward an interior of the first sidewall, wherein the first stress relief feature is configured to direct deployment energy toward a desired portion of the airbag cover to limit undesired tearing of the airbag cover.

18. The airbag cover of claim 17, wherein the first stress relief feature comprises a first stress relief tear seam configured to tear based on an amount of deployment energy to slow down the tearing of the first cover face tear seam and dissipate deployment energy in a manner to limit undesired tearing of the first cover face tear seam down a first sidewall.

19. The airbag cover of claim 18, wherein the first stress relief tear seam is configured to dissipate a portion of the deployment energy in a manner to limit undesired continued tearing of the first cover face tear seam beyond a tear seam stop, wherein the tear seam stop is positioned at the hinge area.

20. The airbag cover of claim 17, wherein the one or more sidewalls comprise a plurality of sidewalls, wherein the one or more cover face tear seams comprise a second cover face tear seam disposed at a point of connection between the cover face and a second sidewall of the plurality of sidewalls, the airbag cover further comprising:

a second stress relief feature formed in a second sidewall of the plurality of sidewalls, the second stress relief feature oriented transverse to the second cover face tear seam and extending from the second cover face tear seam toward an interior of the second sidewall, wherein the second stress relief feature is configured to direct deployment energy toward a second desired portion of the airbag cover to limit undesired tearing of the airbag cover.

21. The airbag cover of claim 20, wherein the second stress relief feature comprises a second stress relief tear seam configured to tear as needed to slow down the tearing of the second cover face tear seam and dissipate deployment energy in a manner to limit undesired tearing of the second cover face tear seam down a second sidewall.

22. The airbag cover of claim 21, wherein the second stress relief tear seam is configured to dissipate a portion of the deployment energy in a manner to limit undesired continued tearing of the second cover face tear seam beyond a second tear seam stop.

23. An airbag cover, comprising:

a cover face configured to face an occupant of a vehicle, when the airbag cover is disposed over an airbag assembly mounted in the vehicle;

one or more sidewalls extending from the front covering portion, the one or more sidewalls configured to engage a housing of an airbag assembly to enclose an unexpanded airbag of the airbag assembly;

one or more cover face tear seams formed in the airbag cover that are rupturable upon expansion of the airbag, the one or more cover face tear seams to form at least a portion of the cover face as a hinged door through which the unexpanded airbag expands during deployment, a first cover face tear seam disposed at a point of connection between the cover face and a first sidewall of the one or more sidewalls, the first front covering tear seam terminating at a first tear seam stop; and a first stress relief tear seam formed in the first sidewall and distanced away from the first tear seam stop, the first stress relief tear seam oriented transverse to the first cover face tear seam and extending from a portion of the first cover face tear seam that is configured to rupture during deployment toward an interior of the first sidewall, wherein the first stress relief tear seam is configured to tear based on an amount of deployment energy to slow down the tearing of the first cover face tear seam and dissipate deployment energy in a manner to limit undesired tear propagation in a high stress area of the airbag cover.

24. The airbag cover of claim 23, wherein the one or more sidewalls comprise a plurality of sidewalls, wherein the one or more cover face tear seams comprise a second cover face tear seam disposed at a point of connection between the cover face and a second sidewall of the plurality of sidewalls, the airbag cover further comprising:

a second stress relief tear seam disposed in a second sidewall of the plurality of sidewalls, the second stress relief tear seam oriented transverse to the second cover face tear seam and extending from the second cover face tear seam toward an interior of the second sidewall, wherein the second stress relief tear seam is configured to tear based on an amount of deployment energy to slow down the tearing of the second cover face tear seam and dissipate deployment energy in a manner to limit undesired tear propagation in a high stress area of the airbag cover.

\* \* \* \* \*